United States Patent [19]

Boula

[11] Patent Number: 5,471,030
[45] Date of Patent: Nov. 28, 1995

[54] INTERNAL EQUIPMENT FOR ELECTRON BEAM BUTT WELDING OF TWO ANNULAR PARTS AND UTILIZATION OF SUCH EQUIPMENT

[75] Inventor: Gérard Boula, Meursault, France

[73] Assignee: Framatome, France

[21] Appl. No.: 241,653

[22] Filed: May 12, 1994

[30] Foreign Application Priority Data

May 12, 1993 [FR] France .................. 93 05726

[51] Int. Cl.$^6$ ............................ B23K 15/04
[52] U.S. Cl. ............................ 219/121.13
[58] Field of Search .......... 219/121.13, 121.14, 219/121.22, 59.1, 61.1, 121.21, 121.63, 121.64

[56] References Cited

U.S. PATENT DOCUMENTS

| 3,783,230 | 1/1974 | Peyrot | 219/121.13 |
|---|---|---|---|
| 4,368,374 | 1/1983 | De Sivry et al. | 219/121.22 |
| 4,370,541 | 1/1983 | De Sivry et al. | 219/121.13 |
| 4,393,294 | 7/1983 | Shima et al. | 219/121.13 |

FOREIGN PATENT DOCUMENTS

| 112752 | 7/1984 | European Pat. Off. . | |
| 236941 | 9/1987 | European Pat. Off. . | |
| 2467657 | 5/1981 | France | 219/61.1 |
| 2598950 | 11/1987 | France | 219/59.1 |
| 53-28534 | 3/1978 | Japan | 219/121.14 |
| 55-48487 | 4/1980 | Japan . | |
| 56-165573 | 12/1981 | Japan | 219/121.14 |
| 60-250887 | 12/1985 | Japan | 219/121.14 |
| 844022 | 8/1960 | United Kingdom . | |
| 2098118 | 11/1982 | United Kingdom | 219/61.1 |

OTHER PUBLICATIONS

Search Report FR 93 05726, Feb. 1994.
Derwent Publications, Abstracts JP55048487, No Publication Date.

*Primary Examiner*—Geoffrey S. Evans
*Attorney, Agent, or Firm*—Pollock, Vande Sande & Priddy

[57] ABSTRACT

The internal equipment (4) includes a metal ring (13) having an outside diameter substantially equal to the inside diameter of the annular parts (1, 2) and including a plurality of radially extending slots in a part of its width defining interconnected adjacent ring segments, and a device (14) for maintaining and thrusting the metal ring (13) against the inner surfaces of the annular parts (1, 2) in their connection region (11) and including a central support part (21) and a plurality of arms (22) of adjustable length having a radiating disposition around the central part (21). The internal equipment (4) further includes two walls (15, 16) defining a fluidtight chamber (8) inside the parts (1, 2).

6 Claims, 1 Drawing Sheet

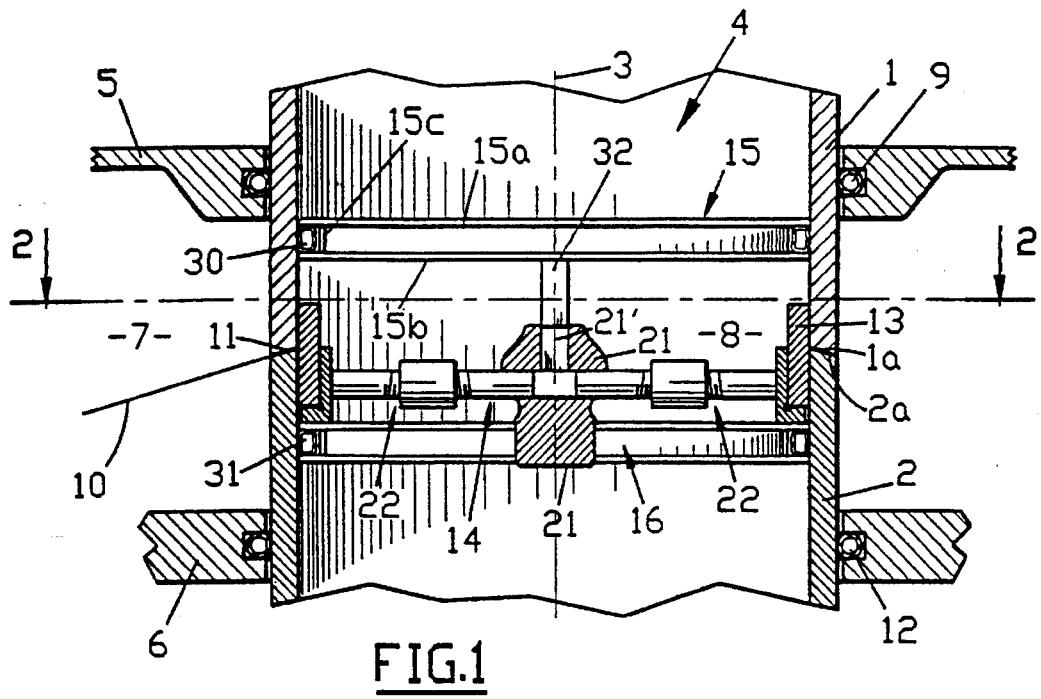
FIG.1
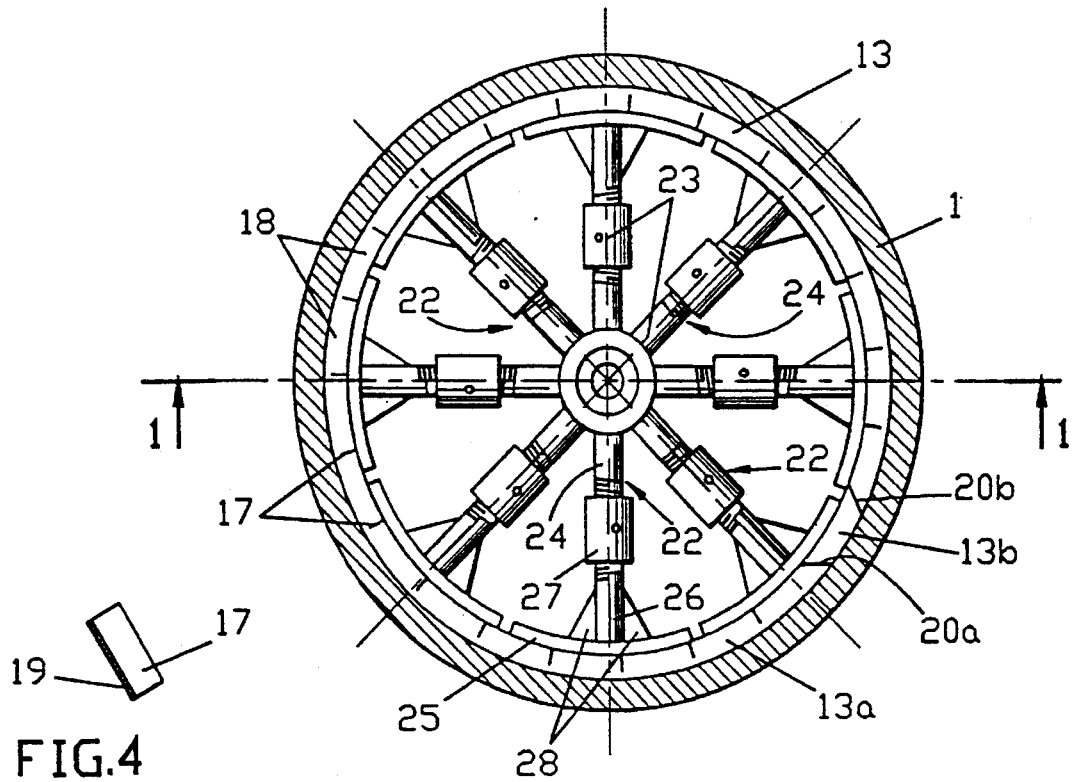
FIG.2
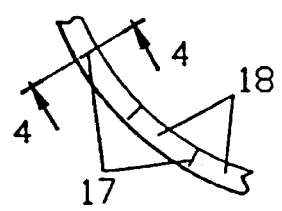
FIG.3
FIG.4

INTERNAL EQUIPMENT FOR ELECTRON BEAM BUTT WELDING OF TWO ANNULAR PARTS AND UTILIZATION OF SUCH EQUIPMENT

The invention relates to an internal equipment for the electron beam butt welding of two annular parts, and in particular of two shells of large diameter constituting a part of an outer wall of a steam generator of a pressurized water nuclear reactor.

BACKGROUND OF THE INVENTION

Pressurized water nuclear reactors comprise components of large size such as steam generators, which have a partly cylindrical outer housing of large diameter and very great height with a wall of medium or great thickness.

This outer wall is generally constructed by the butt welding of cylindrical shells to each other or to an annular assembly flange of a tube plate or a frustoconical shell.

In any case, there is effected an assembly of two annular parts disposed in the axial extension of each other and having their axial ends abutted against each other.

The electron beam welding makes it possible to produce without a filler metal, welded joints of very high metallurgical quality with production times which are considerably reduced as compared with conventional techniques, such as arc welding.

However, one of the difficulties in carrying out the electron beam welding results from the necessity to create a relatively high vacuum around the region of the connection of the parts onto which the electron beam is directed.

In the case of parts of modest size, it is possible to effect the welding inside a fluidtight enclosure enclosing the electron gun in which the parts are introduced and placed in their position of assembly before the enclosure is closed in a fluidtight manner and evacuated.

It will be clear that, in the case of components of very large size such as steam generators, the cost of the installations comprising fluidtight enclosures of very large size and the cost of the operation may become prohibitive.

Consequently, it is envisaged to create a vacuum in a limited volume around the region in which the electron beam welding is effected. However, in the case of the butt welding of annular or tubular parts, the construction of fluidtight enclosures which permit surrounding the welding region presents certain difficulties. In particular, it is necessary to dispose means for constituting a fluidtight enclosure both on the exterior and on the interior of the annular or tubular parts which have joint surfaces abutted against one another.

The electron beam welding is effected by the fusion of the metal of the parts to be welded in a very narrow region along the joint surface of the parts. This fusion is obtained by displacing the electron beam which is directed in the direction of the joint surface of the parts so as to scan the whole of this surface. In the case of annular or tubular parts, the gun producing the electron beam is usually disposed on the outside of the parts and the beam is directed from the exterior toward the interior. It is necessary to dispose a welding heel constituted by a metal strip or member placed in contact with the surfaces of the parts in the region of their joint, on the side opposed to the surfaces onto which the beam is first of all directed. In the case of annular or tubular parts, the welding heel must be placed in contact with the cylindrical inner surface of the parts along the joint region. It has been found to be extremely difficult to provide and place in position a welding heel which is in perfect contact with the inner surface of the parts throughout their internal periphery.

Further, the welding heel, which undergoes a slight fusion during the electron beam welding of the parts, is fixed after welding on the surface of the parts and throughout their periphery. The separation of the welding heel from the welded parts may present certain difficulties owing to the fact that the heel is fixed against the parts throughout its periphery by welding, and possibly owing to the effect of stresses exerted between the parts and the heel.

Therefore difficulties are usually encountered both when placing in position the heel inside the parts and when separating it from the parts after welding.

Further, the geometrical and metallurgical quality of the assembly resulting from the welding of the two annular or tubular parts partly depends on the positioning of the parts with respect to each other before the welding operation proper.

Joint surfaces of generally frustoconical shape are machined on each of the parts to be joined, these surfaces being superposed before welding.

In the case of parts of very large diameter, and more generally in the case where the ratio between the diameter of the parts and their thickness is very large, the positioning of the annular or tubular parts in perfectly coaxial positions may present certain difficulties if means are not provided for guiding and positioning the parts to ensure perfect superpositioning of their joint surfaces.

Heretofore, no device was known for disposing inside annular or tubular parts for effecting their connection by electron beam welding which permitted peforming all the functions mentioned hereinbefore which are required if electron beam welding of high quality is to be effected under economical conditions.

SUMMARY OF THE INVENTION

An object of the invention is therefore to provide an internal equipment for the electron beam welding of two annular parts disposed in the axial extension of each other and having abutting axial ends, the internal equipment permitting an easier and precise positioning of the parts with respect to each other, placing a welding heel in contact with the inner surface of the annular parts in their connection region and ensuring support of the walls of an enclosure containing a vacuum inside the parts.

To this end, the internal equipment according to the invention comprises:

a metal ring having an outside diameter substantially equal to the inside diameter of the annular parts and comprising a plurality of radially extending slots in a part of the width of the ring defining interconnected adjacent ring segments, and a device for maintaining and thrusting the metal ring against the inner surfaces of the annular parts in their connection region, comprising a central support part and a plurality of arms of adjustable length in a radiating disposition about the central part, each of the arms comprising a first end fixed to the central part, a second end carrying a ring support in the shape of an annular sector whose outer surface has a radius substantially equal to the radius of the inner surface of the ring and, between its two ends, means for extending and retracting the arm.

BRIEF DESCRIPTION OF THE DRAWINGS

In order to further explain the invention there will now be described, by way of example, with reference to the accompanying drawings, an embodiment of an internal equipment according to the invention and its utilization for the electron beam butt welding of two cylindrical shells.

FIG. 1 is an axial sectional view taken on line 1—1 of FIG. 2, of two cylindrical shells in position for their electron beam welding in which there is disposed an internal equipment according to the invention.

FIG. 2 is a top plan section view taken on line 2—2 of FIG. 1.

FIG. 3 is a top plan view of a part of the metal ring of the internal equipment shown in FIG. 2.

FIG. 4 is a sectional view taken on line 4—4 of FIG. 3.

DETAILED DESCRIPTION

Shown in FIG. 1 are the end parts of two cylindrical shells 1 and 2 having the same diameter and the same thickness, placed coaxially in the extension of each other and having connecting surfaces of corresponding shape provided on their ends and brought into contact with each other.

The respective connecting surfaces 1a and 2a of the shells 1 and 2 are of frustoconical shape and have their axes coincident with the common axis 3 of the shells 1 and 2.

The frustoconical surfaces 1a and 2a brought into abutment define the electron beam welding bevel which is therefore constituted by a frustoconical ring coaxial with the axis 3 common to the shells 1 and 2.

In fact, the surfaces 1a and 2a are very precisely machined with a very good surface state so that the welding bevel has a substantially zero width, the welding being achieved by fusion of two thin layers of the metal of the shells on each side of their connection surfaces.

For carrying out the electron beam welding, there are fixed on the shells 1 and 2, in fluidtight contact with their outer surfaces, respective walls 5 and 6 of annular shape defining an outer chamber 7 surrounding the joint region of the shells 1 and 2 constituted by abutting surfaces 1a and 2a.

Also disposed inside the shells 1 and 2 in their connection region is an internal equipment 4 according to the invention which defines an internal chamber 8 facing the joint region.

The welding is effected by causing an electron beam 10 which is directed along a generatrix of the frustoconical connection surface of the shells 1 and 2 constituted by the superimposed surfaces 1a and 2a to scan the frustoconical connection region between the shells 1 and 2. The direction of the electron beam 10 is contained in a plane containing the axis 3 with which the direction of the beam 10 makes an angle equal to a semi-angle of the geometrical apex of the surfaces 1a and 2a.

The circumferential scanning of the connection region of the shells 1 and 2 can be effected by causing the shells 1 and 2 to turn simultaneously about their axis 3 and by maintaining the electron gun producing the beam 10 in a fixed position and inclination.

For this purpose, the outer enclosure 7 comprises, in addition to the walls 5 and 6 mounted on and fixed in a fluidtight manner to the surface of the shells 1 and 2 by means of inflatable sealing O-rings 9 and 12, a complementary wall for closing the enclosure 7 which is mounted in an independent manner relative to the shells 1 and 2. Disposed between the walls 5 and 6 connected to the shells 1 and 2 and the complementary wall are sliding sealing elements providing a dynamic seal or fluidtightness between the walls of the outer enclosure 7 during the rotation of the shells 1 and 2.

The electron gun producing the beam 10 is fixed on a part of the complementary wall. Such a device defining a fluidtight outer chamber 7 around the connection region of the shells 1 and 2 the welding of which is effected by an electron beam is disclosed in a patent application of the firm FRAMATOME filed on the same day as the present application.

Devices for evacuating and creating a vacuum, such as circuits comprising pumps (not shown), are associated with the chambers 7 and 8 in such manner as to create a very high vacuum on each side of the connecting region 11 constituted by the superimposition of the surfaces 1a and 2a of the shells 1 and 2.

There will now be described, with reference to FIGS. 1 to 4, the internal equipment 4 according to the invention which is placed in position inside the shells 1 and 2 before carrying out the welding operation.

The equipment 4 comprises a peripheral metal ring 13, a maintenance and thrust device 14 and two walls 15 and 16 in the shape of a disc defining the vacuum chamber 8.

As can be seen in FIG. 2, the metal ring 13 is made in two parts 13a and 13b, the part 13a being an incomplete ring having successive sectors separated by slots 17, and the part 13b serving as a fixing and clamping key.

As can be seen in FIGS. 3 and 4, the successive ring sectors 18 constituting the part 13a of the ring 13 are separated by radially extending slots 17 produced by machining the metal of the ring part 13a in a part of the width of this ring part in the radial direction so that there remains a continuous metal heel 19 of the ring on its outer periphery.

The slots 17 have sufficient width to result in a good resilience of the ring part 13a.

The end surfaces 20a and 20b of the part 13a of the ring 13 are planar and inclined relative to the radial directions of the ring so as to define a space which diverges toward the inner part of the ring 13.

The assembly key 13b of the ring 13 is made in the form of an annular sector having planar end surfaces inclined at an angle permitting its insertion in the manner of a wedge between the end surfaces 20a and 20b of the part 13a of the ring 13.

The planar end surfaces of the key 13b come to bear against the end surfaces 20a and 20b of the part 13a of the ring 13 and exert on these surfaces forces in the circumferential direction which result in radial expansion of the part 13a of the ring, whose successive annular sectors 18 have a certain freedom of movement with respect to one another due to the existence of the slots 17 and the thin heel 19, which is very flexible.

The maintenance and thrust device 14 has a radiating structure and comprises a central part 21 having substantially the shape of a hub of a wheel.

Fixed on the central part 21 in a radiating disposition are arms 22 having axes 23 extending in a radial direction. The arms 22 are evenly spaced apart around the central part 21 so that the axes 23 of any two successive arms form uniform angles.

In the embodiment shown in FIG. 2, the maintenance and thrust device 14 comprises eight arms 22 whose axes 23 form angles of 45° therebetween.

Each of the arms 22 has a first, inner end rigidly fixed to the central part 21 and a second, outer end carrying a shoe 25 in the shape of a sector of a cylinder constituting a support element for the ring 13.

Each of the arms 22 comprises an inner part 24 constituted by a first screw threaded rod, an outer part 26 constituted by a second screw threaded rod and an adjusting tightener 27 constituting a central part of the arm 22. The tightener 27 and the threaded rods may be replaced by an adjusting hydraulic cylinder device.

The threads of the rods 24 and 26 have opposite thread hands and the tightener 27, constituted by a nut having two successive tapped parts, is screwed on the threaded parts of the rods 24 and 26, respectively.

In this way, the length of the arm 22 may be adjusted by turning the nut 27 in one direction or the other so as to lengthen or shorten the arm 22.

The threaded rod 26 is rigidly fixed to the bearing shoe 25 in the shape of a circular sector by means of brackets 28.

Since walls 15 and 16 of the vacuum chamber 8 are made in a substantially identical manner, only the wall 15 will be described. The wall 15 is made in the shape of a flattened cylindrical case having two identical flanges 15a, 15b in the shape of a disc and an annular sleeve 15c constituting a spacer element between the flanges 15a and 15b and fixed to these flanges in a rigid manner, for example by welding.

The sleeve 15c has a diameter less than the diameter of the flanges 15a and 15b so that there is an annular recess on the periphery of the wall 15 in which an inflatable sealing 0-ring 30 may be inserted.

The wall 16 having a structure identical to that of the wall 15 in its peripheral part includes a recess in which an inflatable sealing O-ring 31 may be engaged.

The wall 16 defines a central opening in which is engaged a part of the hub 21 which is rigidly fixed to the wall 16, for example by welding.

The bearing shoes 25 of the arms 22 have a part in the shape of a cylindrical sector whose outer surface has a radius substantially equal to the inside radius of the ring 13 and a part thicker in the radial direction constituting a heel adapted to slide under the ring 13 when the device is placed in position as shown in FIG. 1.

The ring 13 has an outside diameter substantially equal to the inside diameter of the shells 1 and 2 to be welded together.

There will now be described the operations for placing in position, prior to the welding operation proper, the internal equipment 4 inside the two shells 1 and 2 which are to be electron beam butt-welded together.

In a first stage, the part 13a of the ring 13 is engaged inside the end part of the shell 2 so that the inner part of the connection region 11 is located in the vicinity of the central part of the ring 13 with respect to its thickness in the axial direction.

Part 13a of the ring 13 can ben engaged inside the shell 2 because part 13a has a certain flexibility owing to the provision of the slots 17, although the nominal outside diameter of the ring part 13a is such as to permit only a drive fit inside the shell 2.

Ring part 13b is engaged in the free space of the part 13a of the ring and ensures that the outer surface of the ring 13 is maintained flat against the inner surface of the shell 2.

The unit comprising the maintenance and thrust device 14 and the wall 16 is engaged through the end of the shell opposite to the connection surface 2a, in the axial direction, the arms 22 being slightly inwardly retracted so as to permit engagement of the shoes 25 around a part of the ring 13 engaged inside the shell 2. The maintenance device 14 is tightened by screwing the tighteners 27 of the arms 22 which thereby lengthening these arms. The outer surfaces of shoes 25 come to bear against the inner surface of the latter and thereby ensure that the ring 13 is maintained in position and complete the thrust of the outer surface of the ring 13 against the shell 2.

The shell 1 is engaged on the part of the ring 13 which remains projecting from the end of the shell 2. This permits perfect centering and positioning of the connection surfaces 1a and 2a of the shells 1 and 2 with respect to each other.

The shell 1 is premachined so that its inside diameter is substantially equal to the outside diameter of the ring 13.

In the course of placing the shell 1 in position, the centering and the positioning of the wall 15 may be completed by inserting a lock pin 32 in an opening 21' in the central part 21 of the thrust device 14.

It may also be possible to engage the shell 1 on the ring 13 after it has been placed in position in the shell 2 but before it is thrust against the shell 2 by the device 14. The device 14 is then placed in position after the positioning of the shell 1 so as to cause the ring 13 to bear simultaneously against the shells 1 and 2.

In any case, the positioning of the shells 1 and 2 relative to each other is achieved without difficulty and very precisely, even in the case of thin shells of large diameter, owing to the presence of the ring 13 constituting a centering and guiding element.

Preferably, the shell 2 is fixed on a device for rotating it about its axis 3 and ensuring the circumferential scanning thereof in the course of the welding.

The walls defining the outer chamber 7 are mounted.

The sealing elements 9, 12, 30 and 31 are inflated and the chambers 7 and 8 are evacuated.

The electron gun is then started up and the shells 1 and 2 are rotated about their axis 3.

The welding is carried out by a scanning of the connection region 11 between the shells 1 and 2 defined toward the interior by the outer surface of the ring 13 performing the function of a welding heel or strip.

Subsequent to the welding operation, the internal equipment 4 is dismantled and withdrawn from the shells 1 and 2, which are butt welded. For this purpose, the wall 15 is removed so as to gain access to the tighteners 27 of the maintenance device 14, these nuts being rotated in the direction for shortening the arms 22. The unit consisting of the maintenance device 14 and the wall 16 is then separated and extracted from the shell 2.

The ring 13, which has undergone a very slight fusion under the effect of the electron beam 10, remains fixed by the welding on the inner surface of the shells 1 and 2.

The ring 13 can be very easily separated from the shells 1 and 2 by subjecting it to a blow in the region of each of the successive sectors 18, for example by striking with a hammer in the axial direction in the region of each of the sectors 18 so as to break the weak welded joint between the sector and the shells. The metal ring 13 can in this way be easily detached from the inner surfaces of the shells 1 and 2.

The use of the internal equipment 4 according to the invention permits very simple, rapid and perfect positioning of the parts 1 and 2 which are connected by the electron beam welding and placing in position a welding heel in contact with the parts in their connection region throughout their inner periphery, it being possible to easily separate, after welding, this welding heel which perfectly fits against the inner surface of the part.

Further, the device according to the invention permits simply and effectively placing in position walls of a fluidtight enclosure for the purpose of creating a vacuum in the interior volume of the parts in the connection region.

The metal ring and its maintenance and thrust device in a form different from that described.

It is also possible to utilize other forms of the wall defining the inner fluidtight chamber and other manners of placing the walls of the fluidtight chamber in position.

Although the use of inflatable sealing elements for providing fluidtightness between the walls of the chamber and the inner wall of the parts presents considerable advantages, owing to the fact that these inflatable sealing elements can accommodate small geometrical defects in the inner surface of the parts to be welded together, other types of sealing elements can be used.

It is also possible to provide mechanisms which are different from the tighteners engaged on threaded rods for extending or retracting the arms of the maintenance device having a radiating structure.

For example, arms may be provided which are constituted by a fluid cylinder device whose body is fixed to the central part of the maintenance and thrust device and whose rod carries a ring support at its end.

The invention is applicable not only to the electron beam welding of cylindrical shells of large size but also to the electron beam butt-welding of any parts of tubular or annular shape.

What is claimed is:

1. Internal equipment for the electron beam welding from the outside of two annular parts disposed in an axial extension of each other and having axial ends brought into abutment against one another in a connection region, said equipment comprising, in combination:

(a) a metal ring having an outside diameter substantially equal to an inside diameter of said annular parts, said metal ring comprising a first part in the form of an incomplete annular element having a plurality of radially extending slots over a part of a width of said first part of said ring defining adjacent interconnected ring segments, two end surfaces between which said incomplete annular element defines a gap, and a key having an annular sector shape corresponding to a shape of said gap of said incomplete annular element; and (b) a device for maintaining and thrusting said metal ring against inner surfaces of said annular parts in said connection region and comprising a central support part and a plurality of arms of adjustable length having a radiating disposition around said central part, each of said arms comprising a first end part fixed to said central part, a second end part, a ring support carried by said second end part and in the form of an annular sector having an outer surface which has a radius substantially equal to the radius of said inner surface of said ring, and means located between said two end parts for extending and retracting each of said arms.

2. Internal equipment according to claim 1, wherein said end surfaces of said incomplete annular element are inclined relative to radial directions of said ring so that said gap of said incomplete annular element is divergent in a direction toward the interior of said ring.

3. Internal equipment according to claim 1, wherein said arms of adjustable length comprise a first threaded rod having a first hand and constituting said first end part fixed on said central part of said maintenance and thrust device, a second threaded rod having a second hand opposite said first hand and constituting said second end part connected at one end thereof to said ring support, and a tightener constituting said means for extending and retracting said arm and comprising two tapped end portions of opposite hands in which are screwed said first threaded rod and said second threaded rod, respectively.

4. Internal equipment according to claim 1, wherein each of said ring supports comprises a shoe having a first portion having an outer surface in the shape of a cylindrical sector having a radius equal to the internal radius of said metal ring and a second portion projecting outwardly from said first portion and constituting a heel against which said metal ring bears.

5. Internal equipment according to claim 1, further comprising two disc-shaped walls each having an annular peripheral recess and a peripheral sealing element disposed in each said recess, said disc-shaped walls having a diameter substantially equal to the inside diameter of said annular parts of said component, at least one of said disc-shaped walls being fixed to said central part of said maintenance and thrust device.

6. Internal equipment according to claim 5, wherein said peripheral sealing elements of said disc-shaped walls are inflatable sealing elements.

* * * * *